J. Rogers,
Nut Lock,
Nº 79,397. Patented June 30, 1868.
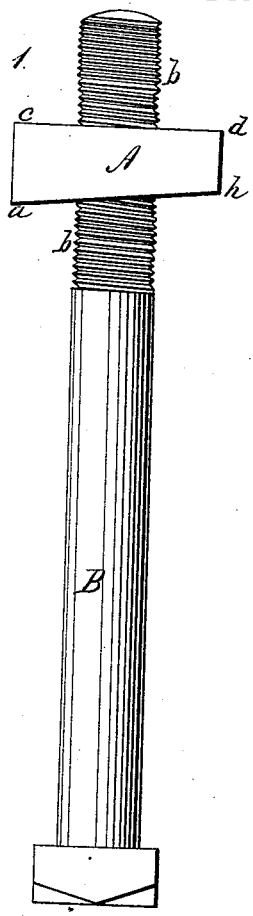
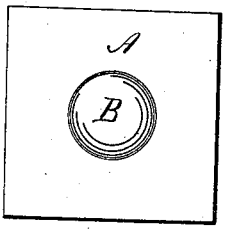
Witnesses;
H. Bruns
M. Benton
Inventor;
Junius Rogers
by Cox

United States Patent Office.

JUNIUS ROGERS, OF STERLING, ASSIGNOR TO HIMSELF AND FREDERICK W. PRATT, OF CHICAGO, ILLINOIS.

Letters Patent No. 79,397, dated June 30, 1868.

IMPROVEMENT IN LOCK-NUTS.

The Schedule referred to in these Letters Patent and making part of the same.

TO ALL WHOM IT MAY CONCERN:

Be it known that I, JUNIUS ROGERS, of Sterling, in the county of Whitesides, and State of Illinois, have invented a new and useful Improved Self-Locking Nut; and I do hereby declare and make known that the following is a full, clear, and exact description of the same, reference being had to the accompanying drawings, and the letters and figures marked thereon, which form a part of this specification.

My said invention relates to an improvement in the construction of nuts which are designed to be screwed upon the end of bolts to secure parts of machinery, or of any framework, together; and it consists in constructing or providing one side of the face of the nut with a projection, or making one side or corner of the nut thicker than the other portions, so that, when the nut is turned up against the surface which it is to hold, the thicker part of or projection upon the nut first comes in contact with such surface, and, by turning the nut a little further on, it binds against said surface at that side of the nut which is thickest, and warps the nut upon the bolt, not enough to injure the thread of the screw, yet sufficiently to turn it out of line, and lock the nut securely in place, and prevent any accidental detachment or loosening of the nut, whereby the parts may be weakened or broken, and the nuts be lost, as is very liable to be the case with nuts of the ordinary construction.

To enable those skilled in the art to manufacture and use my invention, I will proceed to describe the same with particularity, making reference, in so doing, to the aforesaid drawings, in which—

Figure 1 represents a side view of my invention, and

Figure 2 a plan view of the same.

A represents the nuts, and B a bolt, provided at one end with a screw-thread, in the ordinary manner, upon which the nut is turned.

In the view of the nut, as seen in fig. 1, it will be observed that the thickness of the nut upon one side, as indicated at $a\ c$, is greater than the thickness of the nut at the opposite side, as indicated at $d\ h$.

This additional thickness, as seen at $a$, may extend across the entire side of the nut, or it may be confined to one corner, the main point being that there shall be a point upon one side of the nut which shall come in contact with the surface against which the nut is screwed before the remainder of the face of the nut does, so as to warp or turn the nut slightly out of line with the bolt, so that the threads of the nut will bind against the threads on the bolt, and lock the nut, so as to prevent the accidental loosening of the nuts, and their loss, and the consequent damage to the structure or machinery upon which they are used.

Having described the nature, construction, and operation of my invention, I will now specify what I claim, and desire to secure by Letters Patent.

I claim a self-locking nut, constructed and operating substantially in the manner and for the purposes specified.

JUNIUS ROGERS.

Witnesses:
H. H. MUNSON,
J. M. PATTERSON.